United States Patent Office 3,009,945
Patented Nov. 21, 1961

3,009,945
8 - HYDROXYTRICYCLODECANECARBOXYLIC - 4
ACID AND POLYESTERS THEREOF AND PROCESS OF PRODUCTION
Karl Büchner, Oberhausen-Sterkrade, Josef Meis, Oberhausen-Osterfeld, and Helmut Langwald and Otto Roelen, Oberhausen-Holten, Germany, assignors to Ruhrchemie Aktiengesellschaft, Oberhausen-Holten, Germany, a corporation of Germany
No Drawing. Filed July 28, 1954, Ser. No. 446,392
Claims priority, application Germany Aug. 1, 1953
14 Claims. (Cl. 260—468)

This invention relates to improvements in the production of esters and polyesters from a tricyclodecane derivative.

In United States patent application Serial No. 372,152, filed August 3, 1953, and now U.S. Patent 2,817,673, the production of novel esters and polyesters from derivatives from methyl and dimethyl tricyclodecane is described. The production of these esters always involves an esterification reaction between an alcohol and a carboxylic acid.

One object of this invention is the production of esters and/or polyesters starting from a single tricyclodecane derivative. This, and still further objects, will become apparent from the following description:

The starting compound in accordance with the invention is 8-hydroxytricyclodecene-4, which is known, and which, for example, may be produced according to United States patent application Serial No. 401,096, filed December 29, 1953, and now abandoned. The starting 8-hydroxytricyclodecene-4 is the exo-isomer of dihydrocyclopentadiene and may be designated tricyclodecene $(5,2,1,0^{2,6})$ol-8 according to the nomenclature as set forth in Chemical Abstracts, volume 35, No. 24, 5884–5885, 107 (1945).

In accordance with the invention, esters and/or polyesters are produced solely from this 8-hydroxytricyclodecene-4 by converting the unsaturated double bond between the 4 and 5 position in the ring into an aldehyde group by catalytically adding carbon monoxide and hydrogen in accordance with the aldehyde or oxo-synthesis to produce 8-hydroxytricyclodecane-methylal-4, converting the 8-hydroxytricyclodecane-methylol-4 into the corresponding hydroxycarboxylic acid, and esterifying this 8-hydroxytricyclodecane carboxylic-4- acid with itself.

The conversion of the 8-hydroxytricyclodecane-methylal-4 into the acid may be effected by oxidation with oxygen-containing gases. If the methylal is intended to be oxidized with air to produce the acid, the conversion is performed with the use of air the oxygen content of which has been increased by the addition of oxygen. The production of the acid in this manner directly from the aldehyde compound, however, is not of particular advantage. It is much better to first convert the 8-hydroxytricyclodecane-methylal-4 into 8-hydroxytricyclodecane-methylol-4 and then to convert the latter into 8-hydroxytricyclodecane-carboxylic-4 acid by a treatment with molten alkali and the subsequent decomposition of the product with acid.

The treatment of 8-hydroxytricyclodecane-methylol-4 with molten alkali is effected under mild conditions and preferably with the use of hydrocarbons as diluting agent. For this purpose, the 8-hydroxytricyclodecane-methylol-4 is at first diluted with approximately the same volume of a hydrogenated aliphatic hydrocarbon. The chain length of the hydrocarbons used as the diluent is such that the temperature during the treatment with molten alkali is only little in excess of the boiling point of the hydrocarbon added. This avoids too high an additional hydrocarbon vapor pressure in the melting vessel.

The minimum boiling limit for the diluting agent to be used in the treatment with molten alkali should not be below 200° C. Dodecane having a boiling point of 224° C. may be used with particular advantage as the diluting agent. This dodecane may be derived from petroleum fractions or from synthetic hydrocarbons by hydrogenation with nickel catalysts follower by fractionation.

The treatment with molten alkali is most preferably effected with a hydrogen pressure of not more than 500 kg./square centimeter in the melting vessel. The particular advantage of this pressure for the process of the invention resides in the fact that these conditions prevent the hydroxyl group from being inclined to the splitting-off of hydrogen.

The course of a treatment with molten alkali carried out in accordance with the invention may be seen from the following table:

| Time, minutes | Total pressure atmospheres gauge | Temperature, °C. |
|---|---|---|
| 0 | | 20 |
| 20 | 6 | 170 |
| 35 | 12 | 238 |
| 39 | 17 | 247 |
| 45 | 25 | 250 |
| 50 | 30 | 250 |
| 55 | 37 | 251 |
| 60 | 43 | 253 |
| 65 | 49 | 251 |
| 75 | 49 | 252 |

No hydrogen is withdrawn during the treatment with molten alkali. The treatment is effected, for example, in a closed pressure vessel having a capacity of 2900 cc. 300 cc. 8-hydroxytricyclodecane-methylol-4 and 300 cc. of a solvent, dodecane for example, are given into this pressure vessel. With these quantities of starting material, 95 grams of a eutectic mixture of potassium hydroxide and sodium hydroxide are most preferably used for the alkali treatment. Thus, a free gas space of 2260 cc. is left. The quantity of the alkali charged should not be in excess of 120% of that theoretically required. Potassium hydroxide as well as sodium hydroxide may be used. The eutectic mixture of KOH and NaOH has the advantage of having a particularly low boiling point thus simplifying the execution of the alkali treatment. If, in the process of the invention, more than 120% of the theoretically required quantity of alkali hydroxide is used, a splitting-off of the hydroxyl group and even a ring cleavage might occur with the formation of water.

To obtain 8-hydroxytricyclodecane-carboxylic-4 acid, the product from the alkali treatment must be treated with acids. This acid treatment is effected so as to obtain a pH value of less than 3, as, for example, of 2 after the addition of the acid. Any inorganic acid, aqueous hydrochloric acid or sulfuric acid for example, may be used for the recovery of the 8-hydroxytricyclodecane-carboxylic-4 acid. It is also possible to use waste acids. The quantity of acid to be used should be somewhat in excess of that stoichiometrically required.

The conversion of the aldehyde product to the alcohol product having the methylol group in the 4-position may be effected in the known manner by reacting the 8-hydroxytricyclodecane-methylal-4 with hydrogen or water gas in the presence of a catalyst, such as a cobalt catalyst, dissolved in the 8-hydroxytricyclodecane-methylal-4. The subsequent treatment of the methylol-4 compound with molten alkali is effected under mild conditions, and preferably after dilution with hydrocarbons. The product obtained by the alkali treatment is under carefully controlled conditions of temperature converted into the free hydrocarboxylic acid.

The 8-hydroxytricyclodecene-4 may be produced from dicyclopentadiene ($C_{10}H_{12}$) by catalytically adding water by means of a dilute sulfuric acid in accordance with the said United States patent application Serial No. 401,096. Before charging the 8-hydroxytricyclodecene-4 to the aldehyde synthesis, it is preferably diluted with hydrocarbons in a ratio of about 1:1. Aromatic hydrocarbons, as, for example, benzene, toluene, xylene, etc. are preferably used for this purpose.

The catalytic addition of carbon monoxide and hydrogen is effected in the conventional manner of the aldehyde (oxo) synthesis in the presence of cobalt-containing catalysts at a temperature between 100 and 20° C. and under a pressure of 150–250 atmospheres gauge. The commercial execution of the oxo synthesis is disclosed in United States Patent 2,327,066 (Roelen) and various other patents. It may be effected in the conventional manner with the use of diluents including aromatic, aliphatic or hydroaromatic hydrocarbons. The process of the invention is with particular advantage effected with the addition of, for example, heptane or cyclohexane or homologues of cyclohexane. The upper boiling limit of the diluent should be about 150° C. in order that the hydrocarbons added may easily be separated as first runnings in the subsequent fractionation.

If the addition of carbon monoxide- and hydrogen-containing gases is effected with the use of reduced cobalt catalysts as being used, for example, for the catalytic hydrogenation of carbon monoxide, the oxo synthesis can be carried out at a temperature of as low as about 120° C. If aqueous cobalt salt solutions such as acid cobalt sulfate solutions are used as the catalyst, the optimum temperature for the addition of carbon monoxide and hydrogen is approximately 150° C. while a pressure of 150–250 kg./square centimeter is used. Any gas pressure in excess of 250 kg./square centimeter may also be used but will not be employed in general for economic reasons. The carbon monoxide to hydrogen ratio which, for example, is about 1:1.2 in water gas may, for the production of 8-hydroxytricyclodecane-methylal-4, considerably be shifted to the hydrogen side. It is possible, for example, to use gases including as much as 4 parts by volume of hydrogen per part by volume of carbon monoxide.

If 8-hydroxytricyclodecane-methylal-4 is not to be recovered as such, the carbon monoxide to hydrogen ratio may be shifted in favor of the carbon monoxide. In this case, a part of the reaction product is obtained as early as in the first stage of the oxo synthesis in the form of 8-hydroxytricyclodecane-methylal-4.

Any catalyst supplying cobalt carbonyl hydrogen may be used for the addition of water gas to 8-hydroxytricyclodecene-4. An example of a suitable catalyst is metallic cobalt in the form of lumps or in a finely divided form. The cobalt may also be deposited on supporting materials such as pumice, kieselguhr, or silica gel. Besides metallic cobalt, cobalt compounds may be used as the oxo catalyst such as cobalt oxides, cobalt carbonates or organic cobalt compounds such as cobalt salts of fatty acid, especially cobalt acetate, cobalt salts of naphthenic acid, cobalt resinates, cobalt salts of dicarboxylic acid, and cobalt salts of inorganic acids such as cobalt salts of hydrohalic acid, sulfuric acid and similar acids.

The quantity of cobalt used as the catalyst amounts to 0.1 to 10 gms. of cobalt per liter of starting material to be converted. If the 8-hydroxytricyclodecane-methylal-4 is to be converted with water gas into the corresponding methylol compound, it is of advantage to use from the beginning at least 10 gms. of cobalt per liter of starting material for the addition of water gas. The catalytic addition of water gas results in a raw aldehyde, which, when using aqueous cobalt magnesium sulfate solutions in accordance with German Patent No. 854,216, contains, for example, 2–3 grams of cobalt per liter of raw aldehyde mixture. The aqueous catalyst solution is separated from the raw aldehyde and water gas is allowed to act upon the raw aldehyde at a temperature of 180–200° C. and under a pressure of 200–300 atmospheres until visible gas absorption ceases. In general, the gas absorption will terminate after two to three hours.

The raw hydroxy alcohol obtained in this manner is removed from the reaction vessel and separated from the residual catalyst by filtration. In contrast to the dark color of the hydroxy aldehyde, the filtrate has a light color and partially separates by itself from the diluting agent if the latter is, for example, toluene. For the complete separation of the diluting agent, the latter is distilled off from the 8-hydroxytricyclodecane-methylol-4 under a slight vacuum of about 200 mm. Hg. The remaining residue of the distillation has, for example, the following characteristics:

| | |
|---|---|
| Hydroxyl number | 540 |
| Carbonyl number | 10 |
| Iodine number | 5 |
| Neutralization number | 3 |
| Ester number | 5 |

It is also possible to hydrate the 8-hydroxytricyclodecane-methylal-4 after the separation of the catalyst solution in the conventional manner in connection with the treatment of oxo aldehydes as, for example, is described in German Patent No. 879,837. After separation of the catalyst solution, the hydroxytricyclodecane-methylal may also be converted into hydroxytricyclodecane-methylol with hydrogen under pressure, preferably under a pressure of 100–200 atmospheres, and with the addition of water and a reduced cobalt catalyst as it is used, for example, for the hydrogenation of carbon monoxide according to the Fischer-Tropsch synthesis.

If 8-hydroxytricyclodecane-methylal-4 is converted into the methylol compound by a hydrating hydrogenation, the quantity of water added amounts to about 10% of the liquid reaction mixture. A hydrogenation of this kind is effected at temperatures of between 160° and 230° C. and preferably between 220 and 230° C. and with the use of a cobalt catalyst. This catalyst may be used in the first stage of the oxo synthesis already. If the addition of water gas is effected by means of aqueous cobalt salt solutions, the catalyst required for the hydrating hydrogenation of the methylal compound is additionally introduced to the hydrogenation stage in the solid form.

The hydrating hydrogenation of the methylal compound may also be effected with the use of a nickel catalyst. Since very much dissolved cobalt is generally contained in the reaction products obtained by the oxo synthesis, the most simple and, moreover, the mildest method of hydrogenating the sensitive methylal compound is by the use of water gas at temperatures of 180–200° C. and of pressures of as high as 300 kg./square centimeter. In this embodiment of the hydrogenation, the splitting-off of water from the 8-hydroxytricyclodecane-methylal-4 is completely avoided.

The 8-hydroxytricyclodecane-methylol-4 prepared in this manner, has, for example, the following characteristics:

| | |
|---|---|
| Hydroxyl number | 565 |
| Carbonyl number | 3 |
| Iodine number | 0 |
| Neutralization number | 3 |
| Ester number | 5 |

The hydrating hydrogenation may also be effected in the presence of lower aliphatic alcohols, as for example, in the presence of aqueous ethanol solutions.

The conversion of the 8-hydroxytricyclodecane-methylal 4 directly into the 8-hydroxytricyclodecane-carboxylic acid by oxidation with air either in the acidic or alkaline range, as, for example, with the addition of mild alkalis, such as soda or potash offers certain difficulties, due to the fact that the hydroxycarboxylic acid is extremely sensitive to temperature increases. At temperatures of as low as 60° C., a self-esterification will occur, which, at elevated temperatures, results in the forming of polyesters. For this reason when the oxidation is effected with air, the yields of the hydroxycarboxylic acid obtained only reach to about 50% of the expected quantity.

The treatment with molten alkali is therefore preferred for the production of the 8-hydroxytricyclodecane carboxylic-4-acid. The treatment with molten alkali may be effected under conventional conditions. When effecting this alkali treatment under the known conditions, however, a substantial formation of unsaturated carboxylic acid which is formed by the splitting off of the hydroxyl group as water with the formation of a new double bond occurs. In order to retain the hydroxyl group in the molecule, it is necessary to so select the conditions for the alkali treatment that neither an excess of alkali nor a temperature in excess of 220° C. is used. If the 8-hydroxytricyclodecane-methylol is diluted with medium boiling range hydrocarbons, as, for example, dodecane, the melting temperatures may be increased to approximately 250° C. without the danger of the splitting off of water. It is also possible to effect the alkali treatment with quantities of caustic soda or caustic potash which are equal to the calculated stoichiometric quantity with reference to the methylol group, or with even an excess of about 10% over the calculated quantity. It is of advantage to effect the treatment with alkali in the presence of oxygen-free gases, as, for example, nitrogen or hydrogen. This is preferably effected, for example, by leaving a hydrogen pressure of about 50 atmospheres in the reaction vessel and only removing the quantity of hydrogen exceeding this pressure.

The alkali treatment itself may be effected within 45-60 minutes. After the termination of the alkali treatment, the residual hydrogen is removed and water in amount of as much as three times that of the 8-hydroxytricyclodecane-methylol charged is added to the hot reaction product. This results in the formation of a thin salt solution which, when using caustic soda, contains 8-hydroxytricyclodecane-carboxylic sodium. This aqueous salt solution has in many cases a yellowish brown color, which may be attributed to impurities obtained from the apparatus.

To produce a colorless hydroxycarboxylic acid, a decolorization is required. In accordance with the invention, the aqueous salt solution, after neutralization of the excess alkali to a pH value of, for example, 6.6, is preferably treated for 3 hours at a temperature of 210° C. with hydrogen at a pressure of 150–250 atmospheres in the presence of 3% by weight of a nickel-magnesia catalyst (100 Ni: 15 MgO: 50 kieselguhr). After the separation of the catalyst, there is obtained a water-clear salt solution, which must be extracted for the removal of the unsaponified constituents, esecially the unconverted 8-hydroxytricyclodecane-methylol. The extraction may be effected in accordance with the known Spitz and Hoenig method. Since, however, the 8-hydroxytricyclodecane methylol is almost insoluble in hydrocarbons and relatively insoluble in ether, it is not possible to use petroleum ether-ether mixtures as extracting agents.

Esters have been found to constitute better solvents for the extraction. When using low boiling esters, as, for example, ethyl acetic ester or amyl acetic ester, however, small amounts of unconverted hydroxy alcohol still present in the soap solution cannot be completely removed.

In accordance with the invention, 8-ketotricyclodecane-4, has been found to be a preferable extracting agent. After the extraction with this solvent, the remainder of the solvent is removed by a final extraction with low boiling aliphatic hydrocarbons, as, for example, with a pentane-hexane fraction or by boiling the salt solution for an extended period of time. The boiling, however, especially after prolonged periods of time, converts the water-clear solution to a weakly yellowish color.

The extracted salt solution is completed decomposed with hydrochloric acid at a pH value of about 2 while stirring. In doing so, a viscous heavy mass having a sirupy or honey-like consistency settles to the bottom of the acidifying vessel. This mass consists of 8-hydroxytricyclodecane carboxylic acid which in this state still contains some water. In the further processing, the water is decanted as far as possible, and the remaining raw hydroxycarboxylic acid is dissolved in ether. After evaporation of the ether in a vaccum desicator at room temperature, a clear, transparent, colorless or faintly colored hydroxycarboxylic acid is obtained, which, for example, has the following characteristics:

Neutralization number _____ 265
Hyroxyl number (calculated: 286) _____ 264
Ester number _____ 0
Iodine number _____ 1
Carbonyl number _____ 1

When heating the 8-hydroxytricyclodecane carboxylic acid to temperatures in excess of 60° C. as, for example, at a temperature of about 90° C., in a drying cabinet, the esterification occurs with the splitting off of water. This esterification will generally not stop at the formation of the monoester, but will proceed to the formation of the polyester. If the hydroxycarboxylic acid is heated with the exclusion of air and under a nitrogen atmosphere to temperatures up to about 300° C. and then subjected to an aftertreatment for one hour at the same temperature and under a vacuum of 0.5 mm. Hg, an almost colorless resin having a melting point of 156° C. and an average molecular weight of about 3,000 is obtained.

The following example is given by way of illustration and not limitation:

Example 2,000 cc. 8-hydroxytricyclodecene-4, 1,500 cc. toluene, and 2,000 cc. of an aqueous cobalt sulfate-magnesium sulfate solution containing 16 gms. Co and 25 gms. MgO per liter were filled into a horizontal autoclave provided with a stirrer and which had a capacity of 10 liters. After scavenging of the autoclave with water gas, water gas from a cylinder was forced into the autoclave until a pressure of 175 kg./sq. cm. was reached and the autoclave was heated to 155° C. At this temperature, the reaction started. The maximum pressure in the gas space during the reaction was 252 atmospheres gauge. At 153° C., 29.4 mols of gas were absorbed within 50 minutes. After cooling of the autoclave, 1980 cc. of catalyst solution and 3,510 cc. of aqueous upper layer were withdrawn. The upper layer was mixed with 300 cc. of a reduced cobalt catalyst, and, after the addition of 500 cc. of water, treated for 120 minutes at 230° C. with hydrogen. The hydrogen absorption was 85 atmospheres gauge corresponding to 11.3 mols.

The reaction product from the hydrating hydrogenation was filtered off from the catalyst, and, after having distilled off the solvent, distilled in an unpacked column of 30 centimeters in length at a reduced pressure of 1 millimeter Hg. After a few cubic centimeters of first runnings, a liquid which was highly viscous at room temperature, and which had the following characteristics, was obtained as the main fraction:

Hydroxyl number _____ 602
Carbonyl number _____ 2
Iodine number _____ 1
Neutralization number _____ 0.2
Ester number _____ 0

5% of resin remained as the residue in the reaction vessel.

300 gms. of this hydroxymethylol fraction, together with 65 gms. KOH and 30 gms. NaOH (eutectic mixture), and 300 cc. dodecane were placed in a copper-lined melting autoclave of 2.26 liters capacity. After having displaced the air in the autoclave by means of hydrogen, the starting mixture was heated to 200° C.

while stirring. The splitting off of hydrogen began at a temperature of as low as 170° C. After 45 minutes, in which time the temperature was slowly increased to 250° C., a hydrogen pressure of 49 atmospheres gauge was reached in the melting vessel. The hydrogen was now completely removed and 1 liter of water was forced by means of hydrogen into the stirring vessel, which was no longer heated. After slowly stirring for 5 minutes, the stirrer was stopped and the autoclave allowed to cool. After opening of the autoclave, 1,580 cc. of a reaction product, consisting of two layers which were not miscible with each other, were obtained. The upper layer consisted of 280 cc. of an oily product which chiefly comprised the dodecane used as the diluting agent, as shown by the following analysis:

| | |
|---|---|
| Iodine number | 1 |
| Neutralization number | 0 |
| Ester number | 0.2 |
| Hydroxyl number | 4 |
| Carbonyl number | 1 |

The lower layer consisted of 1,300 cc. of an aqueous, yellowish-brown salt solution. To this salt solution, which had a pH value of about 10, there was added sufficient dilute hydrochloric acid in portions while stirring, that the pH value dropped to 6.6. During this neutralization, small amounts of a dark oily product were separated and removed from the solution by decantation.

The aqueous, nearly neutral salt solution, with the addition of 3% by weight of a reduced nickel-magnesia-kieselguhr catalyst, was treated for 3 hours with hydrogen under a pressure of about 200 atmospheres gauge and at a temperature of approximately 210° C. After separation of the catalyst by filtration, the aqueous salt solution was water-clear. It was subjected to three extractions, each being effected with 100 cc. ketotricyclodecane. The residues of the last extraction were removed by a final extraction with low boiling aliphatic hydrocarbons (pentanes).

The salt solution, after the purification in the manner described above, was now suited for the treatment with acid and for the recovery of the hydroxytricyclodecane-carboxylic acid. While vigorously stirring, sufficient aqueous hydrochloric acid was added to obtain a pH value of about 2, thereby separating the free hydroxytricyclodecane-carboxylic acid which settled at the bottom as a heavy liquid. The upper layer consisting of acidic water was decanted and the hydroxytricyclodecane-carboxylic acid was dissolved in twice to three times its quantity of ether. The ether solution was freed from the last residues of water by the addition of sodium sulfate and the ether was removed at room temperature under a vacuum of about 20 mm. produced by a water jet pump. Based on the hydroxytricyclodecane-methylol charged, a yield of about 75% of a nearly water-clear hydroxy acid having the following characteristics was obtained:

| | |
|---|---|
| Neutralization number | 265 |
| Saponification number | 265 |
| Hydroxyl number (calculated: 286) | 264 |

The hydroxycarboxylic acid does not crystallize and gives off water at temperatures of as low as above 60° C.

For the production of polyesters, this hydroxycarboxylic acid was dehydrated at temperatures of above 100° C. with nitrogen as the water-entraining agent and then heated to 300° C. under vacuum. This resulted in a polyester of a very light color having the following characteristics:

| | |
|---|---|
| Molecular weight | 3,000 |
| Melting point | 156–160° C. |
| Saponification number | 289 |

The esters produced in accordance with the invention have the following formula:

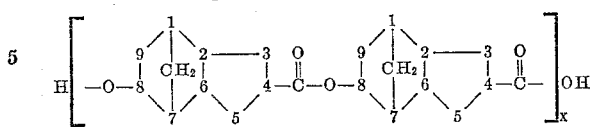

in which X is a whole number and is 1 in the case of the monoester.

The self-esterification of 8 - hydroxytricyclodecanecarboxylic-4 acid starts already at temperatures ranging in excess of 60° C. under a pressure of 760 mm. Hg. For the production of the polyesters, temperatures of as high as 260° C. may be used. The use of higher temperatures results in polyesters of dark color. It is preferable to operate at temperatures of above 200° C. and under vacuum, especially under a pressure of 1 mm. Hg.

The 8 - hydroxytricyclodecane-methylal-4 produced in accordance with the process of the invention, the 8-hydroxytricyclodecane-methylol-4 obtained therefrom, and the 8-hydroxytricyclodecane-carboxylic-4 acid are novel chemical compounds unknown up to the present. They are highly viscous liquids which may be used as starting material for esterifications, polymerizations and for the production of artificial resins.

The properties of 8-hydroxytricyclodecane-carboxylic-4 acid and of 8-hydroxytricyclodecane-methylol-4 are to be seen from the above description. 8 - hydroxytricyclodecane-methylal-4, when diluted with 50% by volume of toluene, has the following characteristics:

| | |
|---|---|
| Iodine number | 1 |
| Hydroxyl number | 134 |
| Carbonyl number | 132 |
| Neutralization number | 7 |
| Ester number | 13 |

The polyesters produced in accordance with the invention are likewise novel chemical compounds having molecular weights of at least 3000. The degree of polymerization, $x$, ranges between 1 and 10. Polyesters of this molecular size melt at approximately 200° C. and still higher temperatures. These esters are very well suited for the production of raw materials of lacquer or varnish. Low molecular weight esters produced in accordance with the process of the invention and having degrees of polymerization of $x=1$ to 3 are highly viscous liquids which may be used as softeners for lacquers.

W claim:

1. Process for the production of 8 - hydroxytricyclodecane carboxylic-4-acid, which comprises converting 8-hydroxytricyclodecene-4 by catalytic addition of carbon monoxide and hydrogen, converting said 8 - hydroxytricyclodecane-methylal-4 formed into the corresponding methylol compound by a hydrating hydrogenation, treating the 8-hydroxytricyclodecane-methylol-4 by treatment with molten alkali at temperatures not in excess of 250° C., and, in the presence of a hydrocarbon as a diluting agent, decomposing the salt produced with acid, and recovering the 8-hydroxytricyclodecane-carboxylic - 4 - acid formed.

2. Process according to claim 1, in which the 8-hydroxytricyclodecene-4 is converted into the 8-hydroxytricyclodecane-methylal-4 by the catalytic addition of carbon monoxide and hydrogen, using an aqueous cobalt sulfate-magnesium sulfate solution at a pH of below 7.0.

3. Process according to claim 1, in which the 8-hydroxytricyclodecane-methylal-4 is converted into the 8-hydroxytricyclodecane-methylol-4 by a hydrating hydrogenation with water gas in the presence of a cobalt-containing catalyst to produce the 8-hydroxytricyclodecane-methylol-4.

4. Process according to claim 1, in which said treatment with molten alkali is effected at a temperature between 200 and 250° C.

5. Process according to claim 1, in which the aqueous solution of 8-hydroxytricyclodecane-carboxylic alkali produced by the treatment with molten alkali is decolorized with hydrogen in the presence of a nickel catalyst prior to said decomposition with acid.

6. Process according to claim 5, which includes extracting hydroxy alcohol from the aqueous solution of the 8-hydroxytricyclodecane-carboxylic alkali with 8 - ketotricyclodecane after said decolorization.

7. Process according to claim 6, which includes removing any residual quantities of the 8-ketotricyclodecane by a final extraction with a low boiling aliphatic hydrocarbon.

8. Process according to claim 7, in which said low boiling aliphatic hydrocarbon is pentane.

9. Process according to claim 1, in which the salt solution obtained by the treatment with molten alkali is decomposed with an amount of a mineral acid sufficient to form a pH of about 2.

10. Process according to claim 9, in which said mineral acid is hydrochloric acid.

11. Process according to claim 1, in which the 8-hydroxytricyclodecane-carboxylic acid is dissolved in ether and dehydrated by evaporating the ether under a vacuum at temperatures between 20 and 30° C.

12. Process according to claim 1 which includes heating the 8-hydroxytricyclodecanecarboxylic - 4 - acid to a temperature ranging up to about 300° C. to thereby cause self-esterification, forming a polyester containing up to 10 mono ester units.

13. Process according to claim 12 in which said heating is effected for several hours initially at normal pressure and thereafter at reduced pressure, ranging to about 0.5 mm. Hg.

14. As a new chemical compound, 8-hydroxytricyclodecane-carboxylic-4-acid.

References Cited in the file of this patent

UNITED STATES PATENTS

| | | |
|---|---|---|
| 2,688,627 | Cohen et al. | Sept. 7, 1954 |
| 2,738,370 | Staib et al. | Mar. 13, 1956 |
| 2,749,328 | Cline | June 5, 1956 |
| 2,883,411 | Lanham | Apr. 21, 1959 |

UNITED STATES PATENT OFFICE
CERTIFICATE OF CORRECTION

Patent No. 3,009,945                                November 21, 1961

Karl Büchner et al.

It is hereby certified that error appears in the above numbered patent requiring correction and that the said Letters Patent should read as corrected below.

Column 2, line 7, for "follower" read -- followed --; column 3, line 12, for "20° C." read -- 200° C. --; line 48, for "-methylal-" read -- -methylol- --; column 5, line 15, for "molecute" read -- molecule --; line 75, for "completed" read -- completely --.

Signed and sealed this 17th day of April 1962.

(SEAL)
Attest:

ESTON G. JOHNSON                              DAVID L. LADD

Attesting Officer                                 Commissioner of Patents